May 13, 1947.  F. T. DIXON  2,420,526
DRIVE SHAFT BRAKE
Filed April 20, 1945  2 Sheets-Sheet 1

Inventor
Frank T. Dixon
By George E. Cook.
Attorney

Patented May 13, 1947

2,420,526

UNITED STATES PATENT OFFICE 2,420,526

DRIVE SHAFT BRAKE

Frank Thomas Dixon, Altoona, Pa., assignor to Dixon Truck Parts Company, Altoona, Pa., a corporation of Pennsylvania Application April 20, 1945, Serial No. 589,381

10 Claims. (Cl. 188—1)

This invention relates to brake mechanism.

The invention is particularly concerned with an improved brake mechanism applicable to the drive shaft of a motor vehicle, or the like, and a primary object of the invention is the provision of a brake mechanism which is operative to bring the drive shaft to rest with a minimum of friction during the braking action whereby relatively little heat is generated which has proven highly objectionable in prior brake constructions.

A further object of the invention is the provision of a brake mechanism wherein the cooperating elements thereof are disposed within a casing surrounding the drive shaft and which casing provides a reservoir for lubricant whereby the cooperating brake elements are protected against dirt as well as the weather elements and are also constantly lubricated by movement of certain elements through the lubricant in the reservoir.

A still further object of the invention is the provision of a brake mechanism of the above noted character which is relatively simple in construction, durable, efficient in operation, and one which is capable of manufacture at relatively low cost.

With the above objects in view, the invention consists in a construction and combination of parts of which a preferred embodiment is illustrated in the accompanying drawings, wherein—

Figure 1:
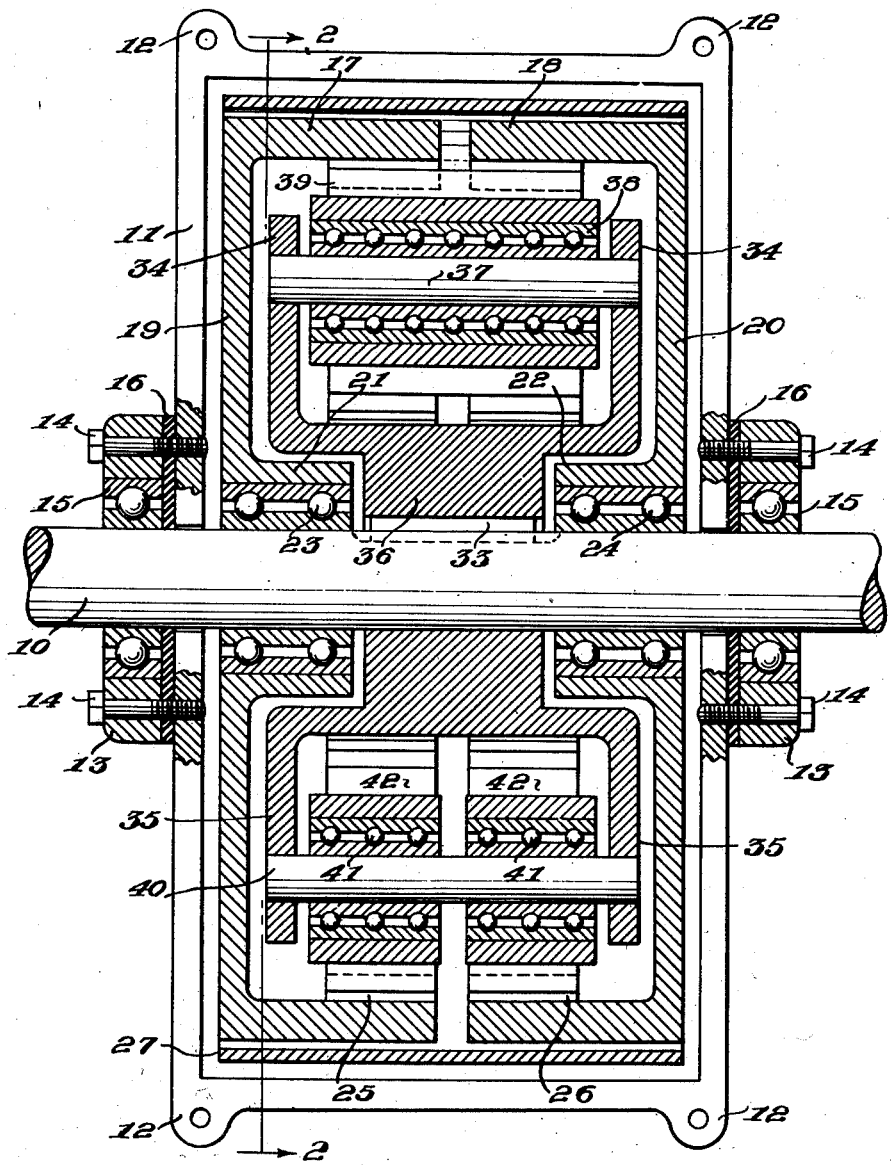
Fig. 1 is a horizontal sectional view as observed in the plane of line 1—1 Fig. 2 and from the right thereof.

Referring now in detail to the drawings, 10 designates a drive or propeller shaft such as is used in motor vehicles and which it is desired to have the speed of rotation thereof gradually reduced and brought to rest by the improved brake mechanism now to be described.

The brake mechanism comprises a casing including lower and upper sections 11 and 11a, and which are preferably provided with apertured cooperating lugs 12 for the reception of suitable fastening means for holding the adjacent edges of the sections in engagement. The casing may be supported by any desirable means.

A bearing cage 13 is removably secured to the casing 11, 11a by means of screw bolts 14, and disposed within each such cage is a bearing 15 for the drive shaft 10.

Figure 2:
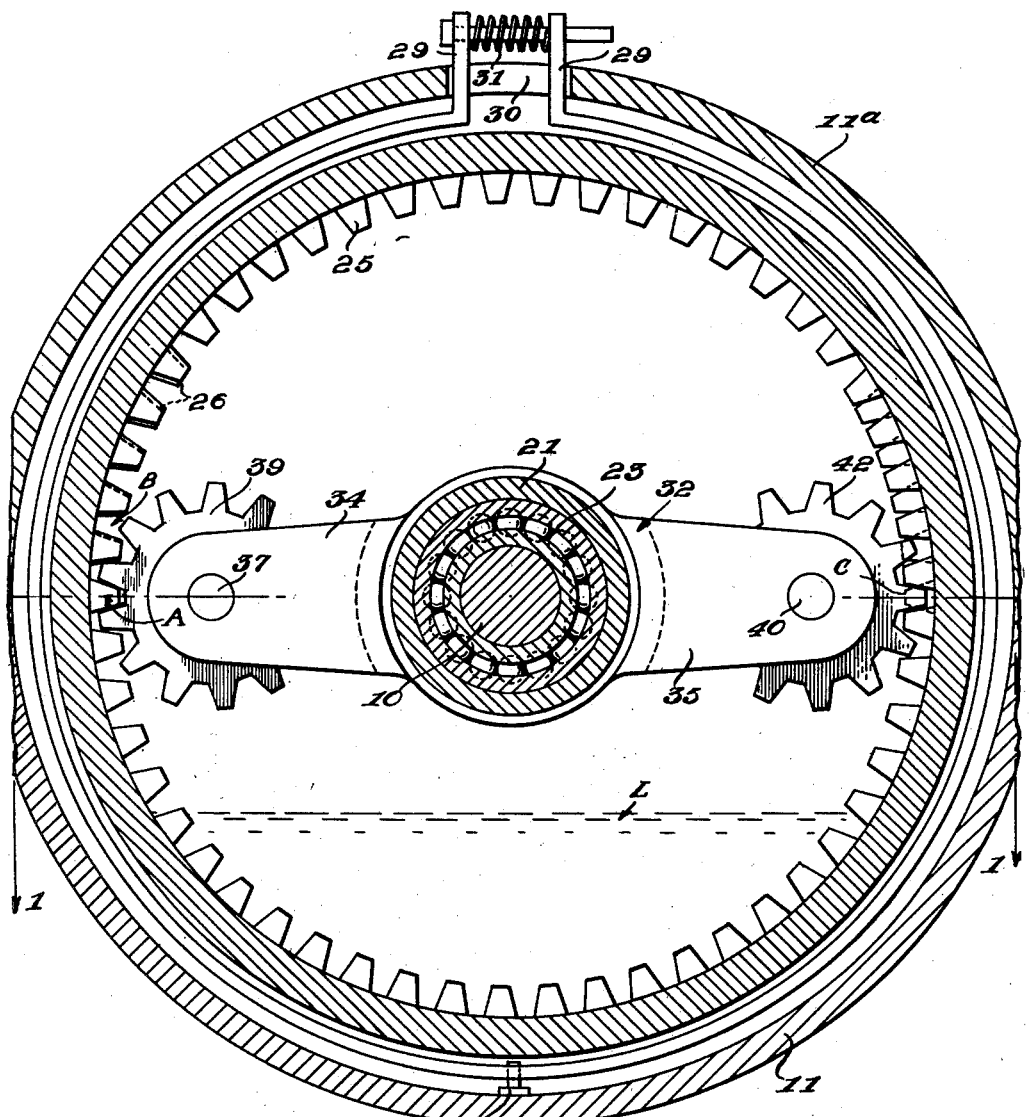
Fig. 2 is a vertical sectional view as observed in the plane of line 2—2 Fig. 1, with the brake band shown in elevation.

Since the casing 11, 11a provides a lubricant housing and wherein the lubricant L may be at any desired level as indicated in Fig. 2, a gasket 16 is preferably disposed between the casing and cages 13 to prevent objectionable escape of lubricant from the reservoir.

A pair of brake drums 17 and 18 are supported by disk-like members 19 and 20 which are centrally provided with hubs 21 and 22 revolubly supported on shaft 10 by means of bearings 23 and 24.

As will be seen from Fig. 1, the brake drums are relatively wide and have their adjacent edges in relatively closely spaced relation.

An internal gear 25 is supported by the drum 17 and an internal gear 26 is supported by the drum 18, and while the gears are illustrated as unitary with the drums, in practice they would preferably be made separate and suitably secured to the drums.

A brake band 27 is disposed within the casing 11, 11a in closely surrounding relation to the drums 17 and 18 and which band is metallic, preferably bronze, without the use of the usual lining.

The brake band is preferably supported at 28 for contractive and retractive movement and the free ends 29 project through an aperture 30 in the upper casing section 11a. The usual spring 31 is disposed between the ends 29 to normally urge the band 27 out of contact with the drums 17 and 18 and any suitable and well known means may be employed to force the band into braking contact with the drums.

A yoke member 32 is keyed as at 33 to the shaft 10 for rotation therewith, and the yoke member includes a pair of laterally spaced arms 34 and a like second pair of arms 35 diametrically of the first arms relative to shaft 10.

The hub portion 36 of the yoke member which is keyed to shaft 10 has its opposite end faces substantially inset from the outer faces of arms 34 and 35 thereby providing recesses for receiving portions of the hubs 21, 22 and the bearings 23, 24 as is clearly illustrated in Fig. 1.

A spindle 37 has its opposite ends supported in arms 34 and supported on the spindle is a bearing 38 on which is rotatably mounted a planetary gear 39.

A second spindle 40 has its ends supported in the arms 35 and which spindle supports a pair of bearings 41 on which are rotatably supported balancing planetary gears 42.

The internal gears 25 and 26 are provided with teeth having the same pitch character, but gear 26 is provided with one more tooth than gear 25, the gears as illustrated being provided with 53 and 54 teeth respectively.

With the construction disclosed, the yoke member 32 and planetary gears 39 and 42 are carried about the axis of shaft 10 in the rotation thereof. The planetary gear 39 meshes with both gears 25 and 26, while the planetary gears 42 separately mesh with gears 25 and 26 and act as balancing means only, such gears in no way effecting the braking action.

Considering now Fig. 2, and assuming that shaft 10 together with yoke 32 and gear 39 are rotating as a unit clockwise, and the gear accordingly rotating counterclockwise about the spindle 37. In this action the teeth on gears 25 and 26 will be successively alined in order to permit meshing of the gear 39 therewith.

As indicated in Fig. 2 the teeth of gears 25 and 26 are alined at A and at C the teeth of the gears are circumferentially spaced one-half the spacing of the teeth, and the teeth are gradually displaced from alinement from the point A to point C.

Thus it will be seen that as a tooth on gear 39 enters the space in gears 25 and 26 at point B, Fig. 2, the two gears 25 and 26 will be rotated a slight distance in opposite directions, the extent of such movement in opposite directions being the same for each mesh of a tooth of gear 39 with the teeth of gears 25 and 26.

Thus it will be seen that gears 25 and 26 rotate very slowly even at a high speed rotation of shaft 10, since gears 25 and 26 will each be rotated only a distance of one-half the spacing of the teeth for each complete rotation of shaft 10.

Upon contraction of the brake band 27, movement of the drums 17 and 18 will be resisted in proportion to the effort applied to the band.

Accordingly rotation of gear 39 will be impeded with a resultant slowing down of the shaft 10. When the brake band is gradually contracted into engagement with the drums 17 and 18, the gear 39, yoke 32 and shaft 10 will be correspondingly slowed down and will be brought to rest upon contraction of the band 27 with sufficient effort to restrain the drums 17 and 18 against rotation.

It is obvious that if gears 25 and 26 had equal numbers of teeth, the gear 39 would roll over such gears even though the gears 25 and 26 were restrained against rotation but since gears 25 and 26 have an unequal number of teeth, alinement thereof is necessary for rotation of gear 39, and when gears 25 and 26 are restrained against rotation by the band 27, the teeth cannot be alined for rotation of the gear 39.

The teeth of gears 42 are of the same pitch diameter as those of gear 39, and the sole purpose of the gears 42 is to balance the rotating parts and thereby avoid undue vibration in the operation.

The improved brake mechanism is a compact unit with all moving parts enclosed in a casing which in turn provides a lubricant chamber and thus the rotating parts are not only protected from dirt and the elements, but are also kept sufficiently lubricated to provide for easy operation as well as to avoid wear.

Furthermore, since the usual fiber brake band is not employed in the improved mechanism, braking action is in no way effected by the lubricant which would be highly objectionable with the usual fiber brake bands.

It is to be particularly observed that, due to the relatively slow speed of rotation of the brake drums, substantially little friction will occur upon application of the brake band as would be the case if the drums rotated at the same speed as the drive shaft.

While I have disclosed but a single specific embodiment of my invention, such is to be considered as illustrative only, and not restrictive, the scope of the invention being defined in the subjoined claims.

Although the foregoing specifications set forth the invention in specific terms, it is to be understood that numerous changes in the shape, size and materials may be resorted to without departing from the spirit and scope of the invention as claimed hereinafter.

What I claim and desire to secure by United States Letters Patent is:

1. A brake mechanism comprising a member adapted for connection with a shaft for rotation therewith, a planetary gear rotatably supported by said member, a pair of co-axial brake drums each provided with an internal gear, the internal gears having unequal numbers of teeth and meshing with the teeth on the planetary gear, and a brake band surrounding the drums effective upon contraction thereof to grip the drums and progressively retard rotation of the drums and internal gears with a corresponding retardation of rotation of the planetary gear, and member and the shaft to which the member is connected.

2. A brake mechanism for a rotatable shaft comprising a yoke member connected to the shaft for rotation therewith, a planetary gear rotatably supported on a spindle carried by the yoke member parallel with and radially spaced from the shaft, a pair of internal gears having unequal numbers of teeth jointly engaged by the planetary gear, a brake drum outwardly of and rigidly supporting each of the internal gears and rotatably supported on the shaft, and a single brake band cooperating with the drums to arrest rotation of the drums, internal gears, planetary gear, yoke member and shaft.

3. A brake mechanism according to claim 2 together with a pair of balancing planetary gears rotatably supported by the yoke member and cooperating with the internal gears diametrically of engagement of the first planetary gear with the internal gears.

4. A brake mechanism according to claim 2 together with a casing enclosing the yoke members, planetary gear, internal gears, brake drums and brake band, and a bearing supporting cage secured to each side of the casing for journalling of the shaft therein.

5. A brake mechanism comprising a cylindrical casing having end walls axially supported on a rotatable shaft, a bearing cage supported by each of the end walls and having a bearing for journalling of the rotatable shaft, a pair of disk members rotatably supported by the shaft within the casing and adjacent the end walls thereof, a brake drum supported by the periphery of each of the disks adjacent the cylindrical wall of the casing, a brake band within the casing for cooperation with the brake drums and means supported by the rotatable shaft for slowly rotating the brake drums in opposite directions.

6. A brake mechanism according to claim 5 wherein said means comprises a member secured to the shaft, a planetary gear rotatably supported by the member, and internal gears of unequal numbers of teeth rigidly supported by the brake drums and meshing with the planetary gear.

7. A brake mechanism for a rotatable shaft comprising a yoke member secured to the shaft for rotation therewith, a pair of internal gears having unequal numbers of teeth rotatably supported by the shaft in closely spaced relation axially of the shaft, a planetary gear rotatably supported by the yoke member radially of the shaft and cooperating with the internal gears to slowly rotate same in opposite directions upon rotation of the shaft, a brake drum rigid with each of the internal gears, and a brake band cooperating with the brake drums 8. A brake mechanism according to claim 7 wherein the brake drums are rigid with disk members having axially extended hubs rotatably supported by the shaft, and wherein said yoke member is provided with recesses partially receiving said hubs.

9. A brake mechanism according to claim 7 together with a casing enclosing the yoke member, internal gears, planetary gear, brake drums and brake band and providing a lubricant reservoir for lubrication of the moving parts 10. A brake mechanism according to claim 7 together with a pair of planetary gears rotatably supported by the yoke member diametrically of the first planetary gear with respect to the shaft and meshing with the internal gears.

FRANK THOMAS DIXON.

REFERENCES CITED

The following references are of record in the file of this patent:

UNITED STATES PATENTS

| Number | Name | Date |
| --- | --- | --- |
| 2,013,891 | Lotts | Sept. 10, 1935 |
| 2,108,401 | Crichton | Feb. 15, 1938 |
| 1,573,894 | Zima | Feb. 23, 1926 |
| 1,615,207 | Alexander | Jan. 25, 1927 |
| 1,679,287 | Alexander | July 31, 1928 |